US012736823B2

(12) United States Patent
Lai et al.

(10) Patent No.: US 12,736,823 B2
(45) Date of Patent: Sep. 15, 2026

(54) HEAD-MOUNTED DISPLAY DEVICE

(71) Applicant: HTC Corporation, Taoyuan City (TW)

(72) Inventors: Yiwei Lai, Taoyuan City (TW); Chang-Hsueh Liu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 248 days.

(21) Appl. No.: 18/669,532

(22) Filed: May 21, 2024

(65) Prior Publication Data

US 2025/0076665 A1 Mar. 6, 2025

Related U.S. Application Data

(60) Provisional application No. 63/535,075, filed on Aug. 29, 2023.

(51) Int. Cl.

*G02B 27/14* (2006.01)
*G02B 27/00* (2006.01)
*G02B 27/01* (2006.01)

(52) U.S. Cl.

CPC ..... *G02B 27/0176* (2013.01); *G02B 27/0093* (2013.01); *G02B 2027/0156* (2013.01); *G02B 2027/0163* (2013.01)

(58) Field of Classification Search

CPC ............ G02B 27/0176; G02B 27/0093; G02B 2027/0156; G02B 2027/0163
USPC ...................... 345/7–9; 359/13–14, 630–633
See application file for complete search history.

(56) References Cited

U.S. PATENT DOCUMENTS 11,726,337 B1 * 8/2023 Huang .............. G02B 27/0149 345/80
2014/0137872 A1 5/2014 Gunaratnam
2020/0081259 A1 * 3/2020 Jo ...................... G02B 27/0176
2020/0233220 A1 * 7/2020 Strongwater ...... G02B 27/0176

FOREIGN PATENT DOCUMENTS

KR 20230085777 A * 6/2023 ......... G02B 27/0176

* cited by examiner

*Primary Examiner* — Mahidere S Sahle
(74) *Attorney, Agent, or Firm* — JCIPRNET

(57) ABSTRACT

A head-mounted display device including a display part and a headrest module is provided. The headrest module includes a base, a first driver, a first soft pad, a first sensor and a controller. The base is pivotally connected to the display part. The first driver is connected between the base and the display part, and is used to drive the base to rotate relative to the display part. The first soft pad is disposed on the base and used to contact a forehead of a user. The first sensor is disposed on the first soft pad and is used to sense the pressure exerted by the forehead on the first soft pad. The controller is electrically connected to the first sensor and the first driver, and is used to control the first driver to drive the base or stop driving the base according to the sensing result of the first sensor.

7 Claims, 4 Drawing Sheets

HEAD-MOUNTED DISPLAY DEVICE

CROSS-REFERENCE TO RELATED APPLICATION

This application claims the priority benefit of U.S. provisional application Ser. No. 63/535,075, filed on Aug. 29, 2023. The entirety of the above-mentioned patent application is hereby incorporated by reference herein and made a part of this specification.

BACKGROUND

Technical Field

The application relates to a display device, and in particular, to a head mounted display device.

Description of Related Art

In recent years, the applications of virtual reality (VR) and augmented reality (AR) have become more and more popular, and there are many types of head-mounted display devices. However, in existing head-mounted display devices, the components used to contact the head are not suitable for all users, causing some users to feel uncomfortable when wearing such head-mounted display devices. Therefore, how to make the head-mounted display device more securely worn on the user's head while also providing the user with a more comfortable experience is an extremely important issue in this field.

SUMMARY

The present application provides a head mounted display device, which helps to improve the user's comfort when wearing it.

The head-mounted display device of the present application includes a display part and a headrest module. The headrest module includes a base, a first driver, a first soft pad, a first sensor and a controller. The base is pivotally connected to the display part. The first driver is connected between the base and the display part, and is used to drive the base to rotate relative to the display part. The first soft pad is disposed on the base and used to contact a forehead of a user. The first sensor is disposed on the first soft pad and is used to sense the pressure exerted by the forehead on the first soft pad. The controller is electrically connected to the first sensor and the first driver, and is used to control the first driver to drive the base or stop driving the base according to the sensing result of the first sensor.

Based on above, in the head-mounted display device of the present application, the controller controls the rotation of the soft pad based on the sensing results of the sensor, which can match the head shape of different users and help improve comfort and stability.

DESCRIPTION OF THE EMBODIMENTS

Figure 1:
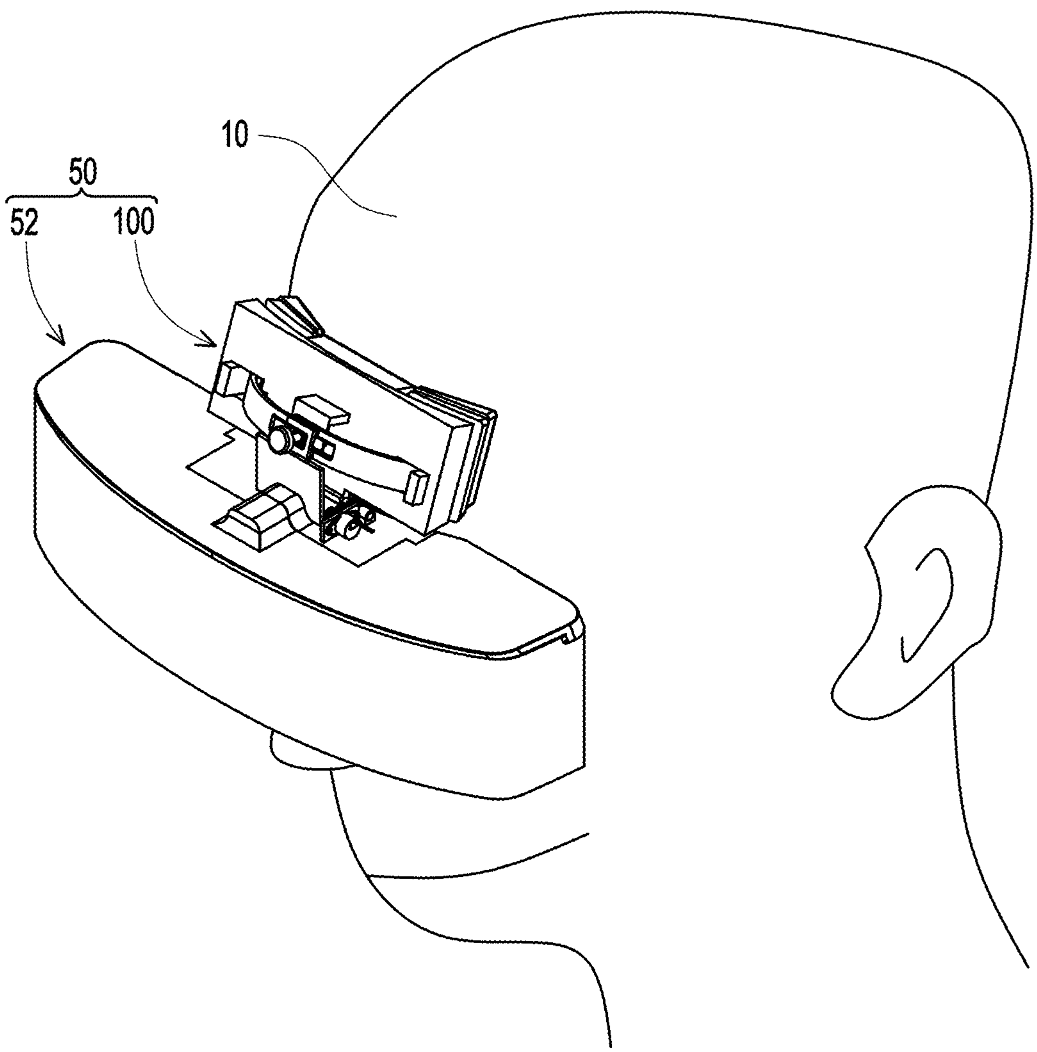
FIG. 1 is a schematic diagram of the usage state of the head mounted display device according to an embodiment of the present invention.

FIG. 1 is a schematic diagram of the usage state of the head mounted display device according to an embodiment of the present invention. Referring to FIG. 1, the head mounted display device 50 of the embodiment includes a display part 52 and a headrest module 100. The display part 52 can be a virtual reality display part, an augmented reality display part or other forms of display part.

Figure 2:
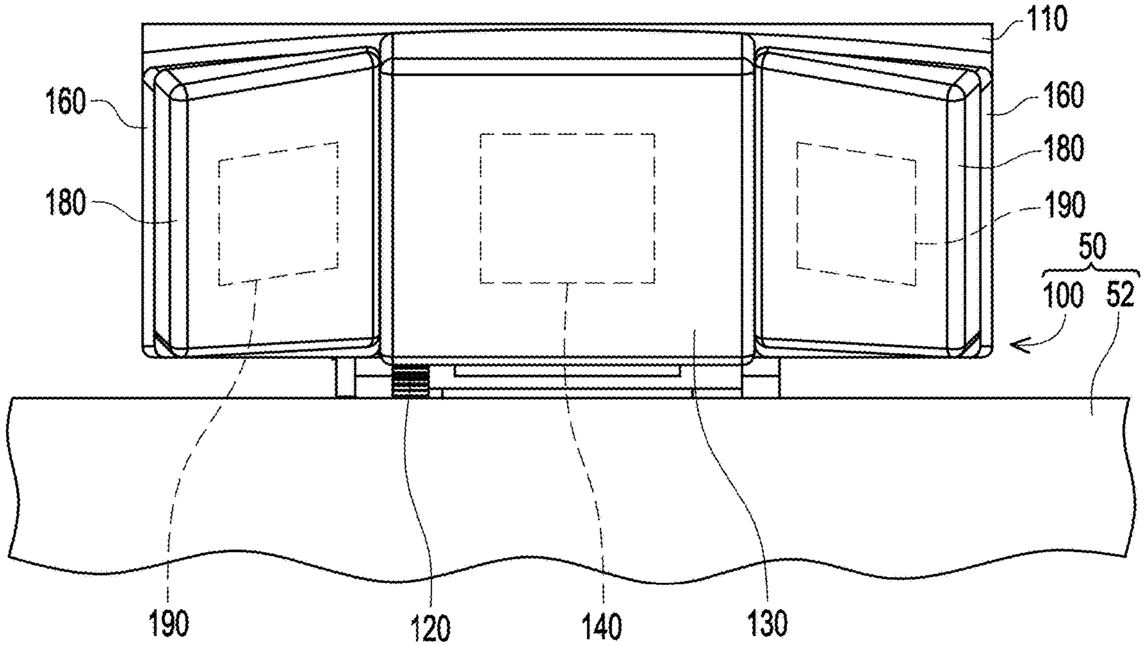
FIG. 2 is a schematic diagram of the head mounted display device of FIG. 1.
Figure 3:
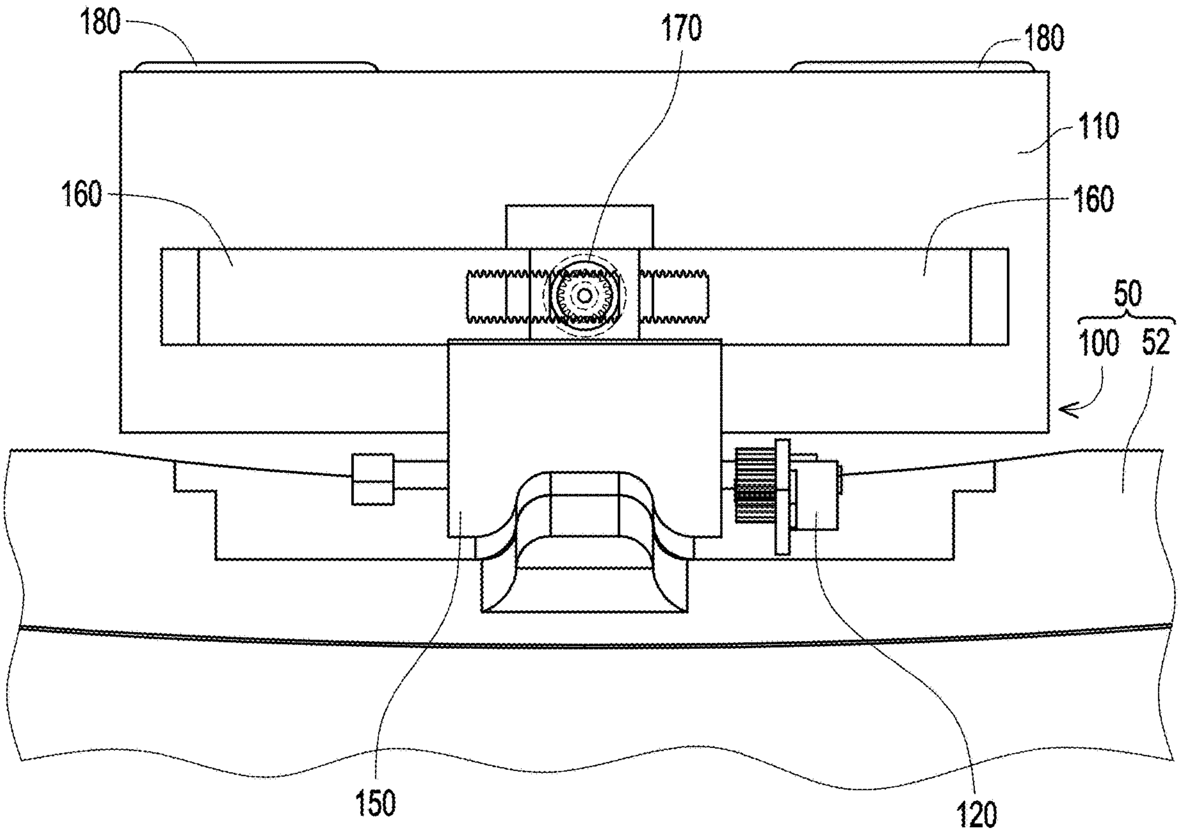
FIG. 3 is a schematic diagram of the head mounted display device of FIG. 1 from another perspective.
Figure 4:
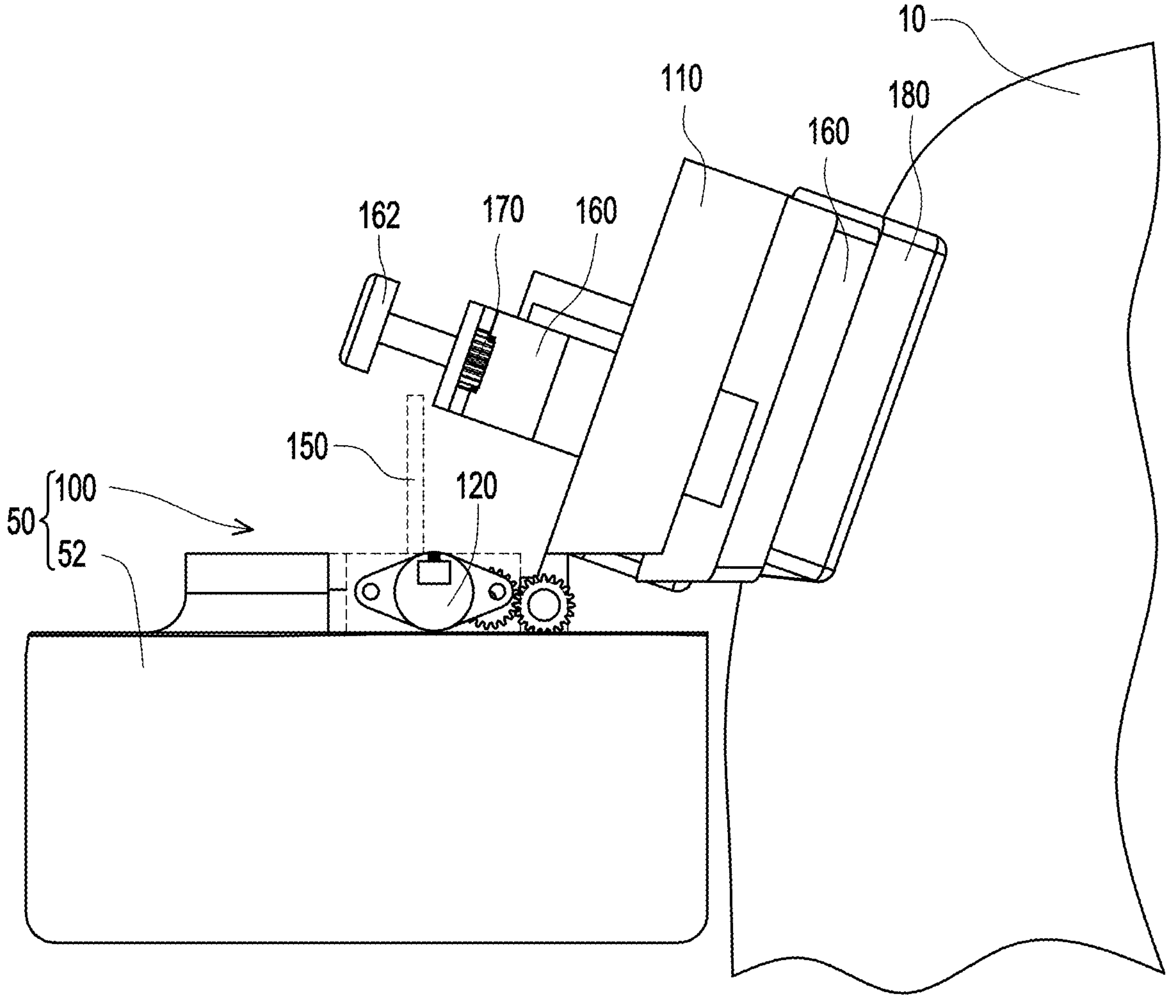
FIG. 4 is a schematic diagram of the operation of the head mounted display device of FIG. 1 in use.

FIG. 2 is a schematic diagram of the head mounted display device of FIG. 1. FIG. 3 is a schematic diagram of the head mounted display device of FIG. 1 from another perspective. Referring to FIG. 2 and FIG. 3, the headrest module 100 of the embodiment includes a base 110, a first driver 120, a first soft pad 130, a first sensor 140, and a controller 150. The base 110 is pivotally connected to the display part 52. That is, the base 110 can rotate relative to the display part 52. The first driver 120 is connected between the base 110 and the display part 52 and is used to drive the base 110 to rotate relative to the display part 52. In other words, the first driver 120 is connected to the base 110, and the first driver 120 is also connected to the display part 52. Therefore, the first driver 120 can change the relative state of the base 110 and the display part 52. For the embodiment, the first driver 120 can drive the base 110 to rotate relative to the display part 52. That is, the first driver 120 can drive the base 110 to rotate clockwise and approach the display part 52 or drive the base 110 to rotate counterclockwise and move away from the display part 52, as shown in the perspective of FIG. 4.

The first soft pad 130 is disposed on the base 110 and is used to contact a forehead 10 of a user (referring to FIG. 1). The first sensor 140 is disposed on the first soft pad 130 and is used to sense the pressure exerted by the forehead 10 on the first soft pad 130. The first sensor 140 can be disposed between the first soft pad 130 and the base 110, or can be buried in the first soft pad 130, or be disposed at other appropriate locations.

The controller 150 is electrically connected to the first sensor 140 and the first driver 120 and is used to control the first driver 120 to drive the base 110 or stop driving the base 110 according to the sensing result of the first sensor 140. That is, the sensing result of the first sensor 140 may be transmitted to the controller 150. The controller 150 controls the first driver 120 to drive the base 110 or stop driving the base 110 according to a comparison result between the sensing result of the first sensor 140 and a threshold. For example, when the sensing result of the first sensor 140 is lower than the threshold, the controller 150 controls the first driver 120 to drive the base 110 to rotate. When the sensing result of the first sensor 140 is equal to or higher than the threshold, the controller 150 controls the first driver 120 to stop driving the base 110. The threshold can be set by the user or set by the manufacturer during production.

In the embodiment, the controller 150 is connected to the display part 52. Therefore, the user can set the aforementioned thresholds in the system shown in the display part 52. However, the controller 150 can also be connected to the display part 52 without signals, and the aforementioned threshold value cannot be changed after being set by the manufacturer, but it can save components and costs required for signal connection. The controller 150 can be connected to the display part 52 via wired or wireless signals.

FIG. 4 is a schematic diagram of the operation of the head mounted display device of FIG. 1 in use. Referring to FIG. 2 and FIG. 4, when the user just wears the head mounted display device 50 of the embodiment, the headrest module 100 is in a state of being far away from the user's forehead 10. Then, the first driver 120 can be started electronically or manually by the user, or based on sensing whether the user is wearing the head mounted display device 50 to drive the base 110 to rotate relative to the display part 52. At this time, the base 110 may be rotated toward the user's forehead 10, and the first soft pad 130 may contact the user's forehead 10. After the first soft pad 130 contacts the user's forehead 10, the first sensor 140 can start to sense the pressure exerted by the forehead 10 on the first soft pad 130, and transmit the sensing result to the controller 150. When the controller 150 determines that the sensing result has not exceeded the threshold, it controls the first driver 120 to continue driving the base 110 to rotate, so that the soft pad 130 is closer to the user's forehead 10, thereby improving the stability of the wearing. When the controller 150 determines that the sensing result is equal to or higher than the threshold, it controls the first driver 120 to stop driving the base 110 to prevent the soft pad 130 from causing discomfort to the user.

Each user's head shape is different, such as the slope of the forehead. However, the angle of the first soft pad 130 of the head mounted display device 50 of the embodiment can be changed, so that it can better contact the foreheads of different users. In this way, it helps to improve the user's comfort when wearing the head mounted display device, and thereby increases its stability when worn on the user's head.

In the embodiment, the base 110 is pivotally connected to the display part 52 in a relatively fixed manner. However, in other embodiments, the base 110 can also be detachably pivotally connected to the display part 52, so that the user can decide whether to install the headrest module 100 according to needs.

Figure 5:
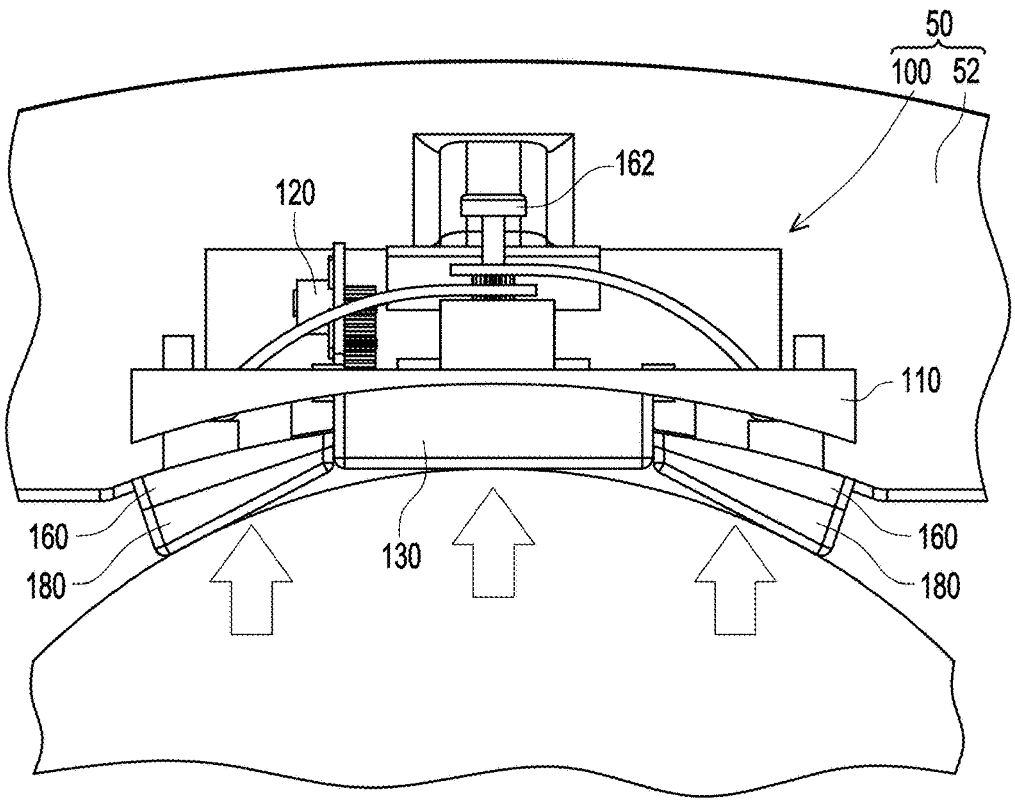
FIG. 5 and FIG. 6 are schematic diagrams of the head mounted display device of FIG. 1 being worn on the heads of different users.
Figure 6:
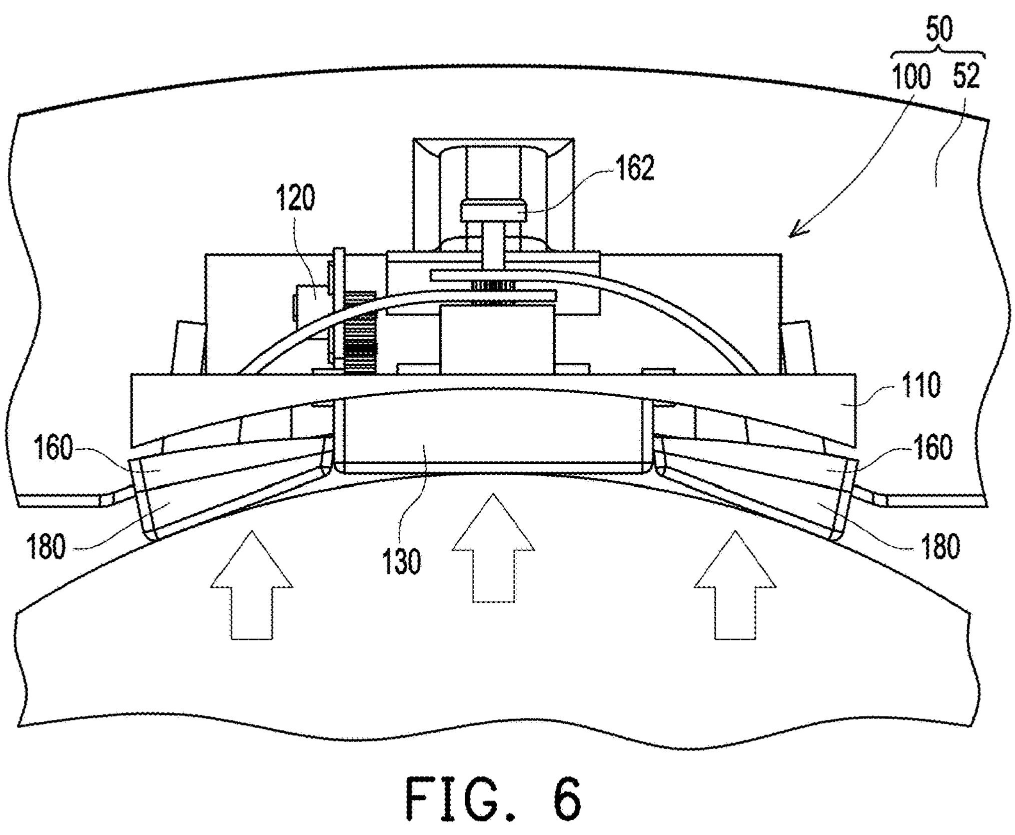

FIG. 5 and FIG. 6 are schematic diagrams of the head mounted display device of FIG. 1 being worn on the heads of different users. Referring to FIG. 4 to FIG. 6, in the embodiment, the headrest module 100 further includes two soft pad bases 160, a second driver 170, two second soft pads 180, and two second sensors 190. The two soft pad bases 160 can be removably disposed on the base 110. The second driver 170 is connected between the base 110 and the soft pad bases 160 and is used to drive the soft pad bases 160 to move relative to the base 110. In other words, the second driver 170 is connected to the base 110, and the second driver 170 is also connected to the two soft pad bases 160, such that the second driver 170 can change the relative state of the base 110 and the two soft pad bases 160. In the embodiment, the second driver 170 can drive the two soft pad bases 160 to move relative to the base 110.

The two second soft pads 180 are disposed on the soft pad bases 160 and located on both sides of the first soft pad 130 for contacting the forehead 10. That is, the two second soft pads 180 and the first soft pad 130 together form an approximate curved surface for contacting the forehead. When the two soft pad bases 160 move relative to the base 110, the angle between the two second soft pads 180 and the first soft pad 130 can change, so the curvature of the approximate surface formed by the three can change.

The two second sensors 190 are disposed on the second soft pads 180 and are used to sense the pressure exerted by the forehead 10 on the second soft pads 180. The controller 150 is further electrically connected to the second sensors 190 and the second driver 170 and is used to control the second driver 170 to drive the soft pad bases 160 or stop driving the soft pad bases 160 according to the sensing result of the second sensors 190, so as to change the angle between the second soft pads 180 and the first soft pad 130. That is, the sensing result of the second sensors 190 may be transmitted to the controller 150. The controller 150 controls the first driver 120 to drive the soft pad bases 160 or stop driving the soft pad bases 160 based on a comparison result between the sensing result of the second sensors 190 and a threshold. For example, when the sensing result of the second sensors 190 is lower than the threshold, the controller 150 controls the second driver 170 to drive the soft pad bases 160 to move so that the second soft pads 180 can be rotated. When the sensing result of the second sensors 190 is equal to or higher than the threshold, the controller 150 controls the second driver 170 to stop driving the soft pad bases 160 to move. The threshold can be set by the user or set by the manufacturer during manufacturing. In this way, the two second soft pads 180 can well contact the user's forehead regardless of whether the user's forehead has a larger or smaller radius of curvature.

In the embodiment, the head mounted display device 50 further includes a knob 162 coupled to the soft pad bases 160, which is used for the user to manually drive the soft pad bases 160 to move relative to the base 110, so as to change the angle between the second soft pads 180 and the first soft pad 130. That is, the user can fine-tune the angle of the two second soft pads 180 according to their own preference.

In the embodiment, the first driver 120 includes a first motor 122, and the second driver 170 includes a second motor 172. The rotation axis 122A of the first motor 122 and the rotation axis 172A of the second motor 172 are perpendicular to each other. That is, the direction of the rotation axis of the base 110 relative to the display part 52 is perpendicular to the direction of the rotation axis of the second soft pads 180 relative to the first soft pad 130. In addition, the first motor 122 uses mechanical structures such as gears, cams, connecting rods, and racks to drive the base 110, and the second motor 172 can also use mechanical structures such as gears, cams, connecting rods, and racks to drive the soft pad bases 160.

In summary, in the head mounted display device of the present application, because of the sensors, the soft pads can be automatically rotated to the angle that best suits each user's forehead, suitable for matching the head shapes of different users. Therefore, it helps to improve the user's comfort when wearing the head mounted display device, and thereby increases its stability when worn on the user's head.

What is claimed is:

1. A head mounted display device, comprising:

a display part;

a headrest module, comprises:

a base, pivotally connected to the display part;

a first driver, connected between the base and the display part, is used to drive the base to rotate relative to the display part;

a first soft pad, disposed on the base, is used to contact a forehead of a user;

a first sensor, disposed on the first soft pad, is used to sense the pressure exerted by the forehead on the first soft pad;

a controller, electrically connected to the first sensor and the first driver, is used to control the first driver to drive the base or stop driving the base according to the sensing result of the first sensor;

two soft pad bases, removably disposed on the base;

a second driver, connected between the base and the soft pad bases, is used to drive the soft pad bases to move relative to the base;

two second soft pads, disposed on the soft pad bases and located on both sides of the first soft pad, are used to contact the forehead; and two second sensors, disposed on the second soft pads, are used to sense the pressure exerted by the forehead on the second soft pads, wherein the controller is further electrically connected to the second sensors and the second drivers and is used to control the second drivers to drive the soft pad bases or stop driving the soft pad bases according to the sensing result of the second sensors, so as to change the angle between the second soft pads and the first soft pad.

2. The head mounted display device according to claim 1, further comprises a knob, coupled to the soft pad bases, is used for the user to manually drive the soft pad bases to move relative to the base to change the angle between the second soft pads and the first soft pad.

3. The head mounted display device according to claim 1, wherein the first driver comprises a first motor, the second driver comprises a second motor, the rotation axis of the first motor and the rotation axis of the second motor are perpendicular to each other.

4. The head mounted display device according to claim 1, wherein the display part is a virtual reality display part or an augmented reality display part.

5. The head mounted display device according to claim 1, wherein the base is detachably pivoted to the display part.

6. The head mounted display device according to claim 1, wherein the controller is connected to the display part.

7. The head mounted display device according to claim 1, wherein the controller controls the first driver to drive the base or stop driving the base according to a comparison result between the sensing result of the first sensor and a threshold set by the user.

* * * * *